United States Patent
Takasuga

(10) Patent No.: US 7,387,697 B2
(45) Date of Patent: Jun. 17, 2008

(54) METHOD AND APPARATUS FOR TURNING UP TIRE STRUCTURE MEMBERS

(75) Inventor: Yutaka Takasuga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 328 days.

(21) Appl. No.: 10/544,771

(22) PCT Filed: Feb. 9, 2004

(86) PCT No.: PCT/JP2004/001320

§ 371 (c)(1),
(2), (4) Date: Aug. 8, 2005

(87) PCT Pub. No.: WO2004/069528

PCT Pub. Date: Aug. 19, 2004

(65) Prior Publication Data

US 2006/0180263 A1    Aug. 17, 2006

(30) Foreign Application Priority Data

Feb. 7, 2003  (JP) .............................. 2003-030382

(51) Int. Cl.
*B29D 30/26* (2006.01)
*B29D 30/32* (2006.01)
(52) U.S. Cl. ........................ 156/132; 156/402; 156/415
(58) Field of Classification Search ................ 156/400, 156/402, 415, 132
See application file for complete search history.

(56) References Cited

U.S. PATENT DOCUMENTS

| 3,887,423 A | * | 6/1975 | Gazuit | ........................ 156/402 |
| 4,131,500 A | | 12/1978 | Wilde et al. | |
| 2001/0050148 A1 | * | 12/2001 | Terazono | ...................... 156/415 |

FOREIGN PATENT DOCUMENTS

| DE | 21 24 978 A1 | 12/1971 |
| JP | A 9-226020 | 9/1997 |
| JP | A 2001-525748 | 12/2001 |

* cited by examiner

*Primary Examiner*—Geoffrey L Knable
(74) *Attorney, Agent, or Firm*—Oliff & Berridge, PLC

(57) ABSTRACT

To effectively restrict occurrence of radially extending grooves in tire sidewall portions, turn-up portions (N) of a tire structure member (K) are turned up around the beads (B) by synchronously moving turn-up arms (66) axially inward by a moving means (75), with turn-up rollers (70) maintained in contact with the turn-up portion (N), and simultaneously, by synchronously swinging the turn-up arms (66) radially outward by a swinging means (76). The contact pressure of the turn-up rollers (70) applied to the turn-up portion (N) can thus be easily adjusted to an optimum value, with the result that impressions (grooves) produced in the outer surface of the turn-up portion (N) (which becomes part of the tire sidewall portion after being turned up) can be kept as shallow as possible.

3 Claims, 2 Drawing Sheets

METHOD AND APPARATUS FOR TURNING UP TIRE STRUCTURE MEMBERS

TECHNICAL FIELD

The present invention relates to a method and an apparatus for turning up a tire structure members, wherein a substantially cylindrical turn-up portion of the tire structure member located on both outsides of bead portions in the axial direction is turned around the bead so as to extend along a main body portion of a substantially semicircular shape, which is located between the beads.

BACKGROUND ART

Conventional method and apparatus for turning up a tire structure member are disclosed, for example, in JP2001-525748A. This known apparatus includes a plurality of turn-up arms which are arranged as being spaced from each other in the peripheral direction, on both axially outer sides of a tire building drum. The turn-up arms are adapted to swing in the radial direction around the respective base ends separated from a bead lock body in a plane including the center axis of the tire building drum. A turn-up roller is rotatably supported by the tip end of each turn-up arm and adapted to achieve a rolling contact with the turn-up portion. A rubber band is fitted to the outside of the turn-up arms so that the turn-up arms are applied with urging swing force oriented radially inward. A moving means is provided for synchronously moving the turn-up arms axially inward, to thereby cause the turn-up arms to synchronously swing radially outward against the rubber band while the turn-up rollers are maintained in rolling contact with the turn-up portions, so that the turn-up portions are turned around the beads.

However, in such conventional method and apparatus for turning up a tire structure member, when the turn-up portion is turned, the swinging movement of the turn-up arm radially outward is performed by applying a moving force to the turn-up arm axially inward, so that the turn-up rollers are made to ascend along the main body portion. At this time, since the turn-up arms are swung against the resilient force of the rubber band, the turn-up rollers are strongly urged against the turn-up portions under a large reaction force from the rubber band. As a result, impressions (grooves) extending in the radial direction is generated in the outer surface of the turn-up portion. Such impressions tend to be considerably deep and cannot be erased even by vulcanization in some cases, giving rise to a problem that grooves extending in the radial direction are generated in sidewall portions of a product tire.

It is an object of the present invention to provide a method and an apparatus for turning up a tire structure member, capable of effectively restricting generation of grooves in a sidewall portion.

DISCLOSURE OF THE INVENTION

To this end, the present invention in its first aspect provides a method for turning up a tire structure member, wherein a pair of beads are supported by a tire building drum from radially inside, and substantially cylindrical turn-up portions of the tire structure member located on axially outside of the beads are turned around the beads to extend along a main body portion of the tire structure member located between the beads and having a substantially semicircular cross-section, with an apparatus including a plurality of turn-up arms spaced from each other in a peripheral direction and arranged on both outsides of the tire building drum in the axial direction, said turn-up arms each being adapted to swing in the radial direction around a base end spaced from the bead on a plane including the center axis of the tire building drum, and further including turn-up roller rotatably supported by tip ends of the turn-up arms, wherein the turn-up arms are moved synchronously by a moving means axially inward, with said turn-up rollers maintained in contact with the turn-up portion, while said turn-up arms are swung synchronously by a swinging means radially outward so that the turn-up portions are turned around the bead.

The present invention in its second aspect provides an apparatus for turning up a tire structure member, wherein a pair of beads are supported by a tire building drum from radially inside, and substantially cylindrical turn-up portions of the tire structure member located on axially outside of the beads are turned around the beads to extend along a main body portion of the tire structure member located between the beads and having a substantially semicircular cross-section, said apparatus comprising: a plurality of turn-up arms spaced from each other in a peripheral direction and arranged on both outsides of the tire building drum in the axial direction, said turn-up arms each being adapted to swing in the radial direction around a base end spaced from the bead on a plane including the center axis of the tire building drum; a plurality of turn-up rollers rotatably supported by tip ends of the turn-up arms and adapted to achieve rolling contact with the turn-up portion; a moving means for synchronously moving the turn-up arms in the axial direction; and a swinging means for synchronously swinging the turn-up arms in the radial direction, wherein the turn-up arms are moved synchronously by a moving means axially inward, with said turn-up rollers maintained in contact with the turn-up portion, while said turn-up arms are swung synchronously by a swinging means radially outward so that the turn-up portions are turned around the bead.

According to the present invention, in order that the turn-up portion of the tire structure member is turned around the bead, the turn-up arms are synchronously moved by the moving means axially inward, with the turn-up rollers maintained in contact with the turn-up portion, and the turn-up arms are synchronously swung by the swinging means radially outward. Therefore, the contact pressure of the turn-up rollers against the turn-up portion can be easily adjusted to an optimum value, and the impressions (grooves) generated in the outer surface of the turn-up portion (to be a part of the tire sidewall portion after being turned up) can be made as shallow as possible. As a result, the above-described grooves cab be substantially erased by vulcanization, and generation of the grooves extending in the radial direction on the sidewall portion of a product tire can be easily and effectively restricted.

The turning up apparatus for a tire structure member according to the present invention may be designed so that the moving means comprises an inner slider which is movable in the axial direction, and the swinging means comprises an outer slider slidably fitted in the inner slider and overlapped with the inner slider at least at its axially inner end, a plurality of links each having an inner end connected to the inner slider and an outer end rotatably connected to a center part in the longitudinal direction of each turn-up arm, and a moving mechanism for axially moving the outer slider relative to the inner slider. It is thereby possible to maintain the pressing force against the turn-up portion constant regardless of elapse of the time, to secure a stable tire quality, and to simplify the structure allow manufacturing at low cost.

Additionally, the turning up apparatus for a tire structure member according to the present invention may be designed so that the moving mechanism comprises a cylinder chamber formed between the inner slider and the outer slider, and a supply/discharge passage for supplying or discharging a fluid to or from the cylinder chamber. It is thereby possible to reduce the entire axial length of the apparatus as a whole.

BEST MODE FOR CARRYING-OUT OF THE INVENTION

A preferred embodiment of the present invention will be described below with reference to the drawings.

Figure 1:
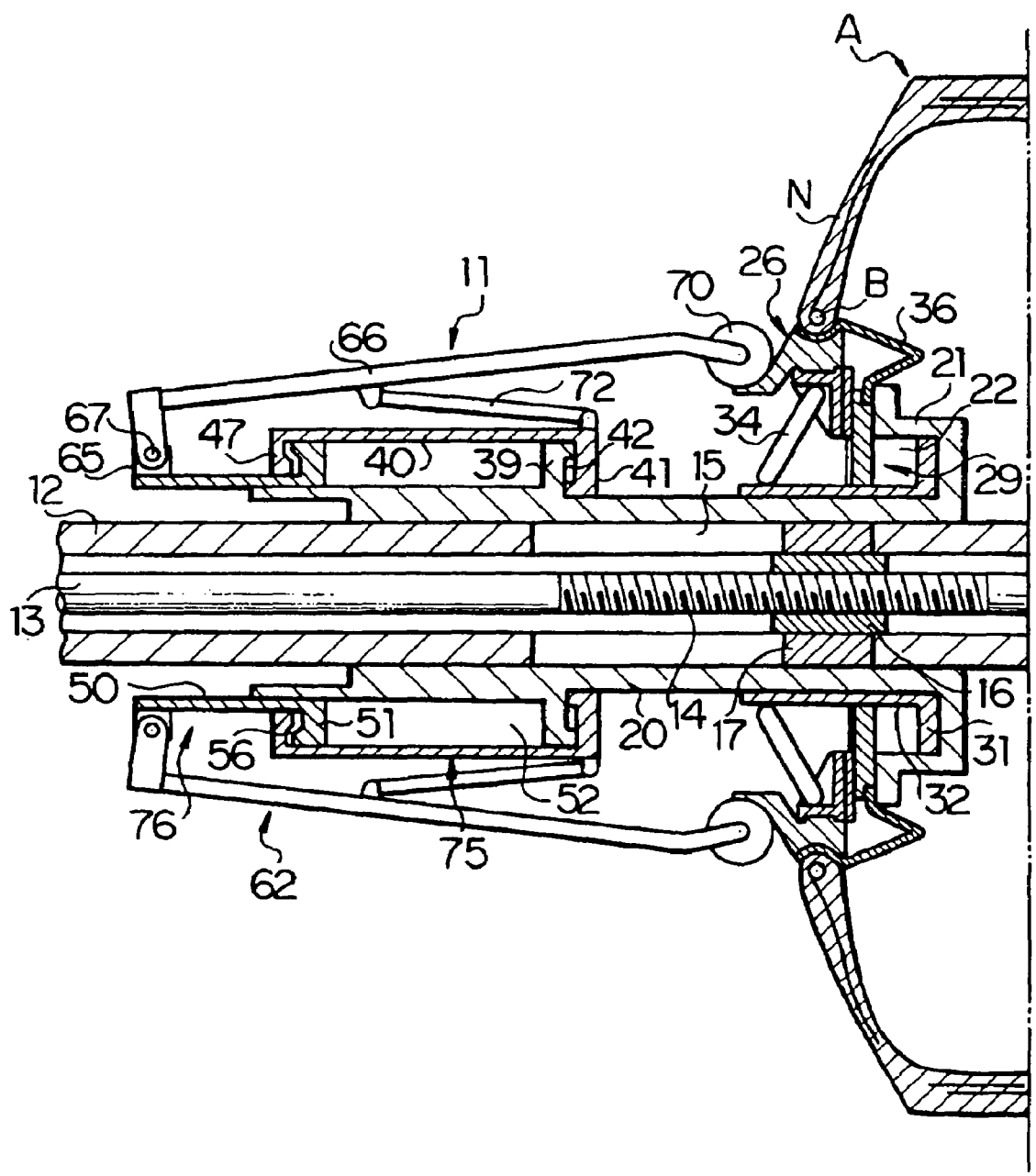
FIG. 1 is a sectional view, as seen from the front side, illustrating a preferred embodiment of the present invention.
Figure 2:
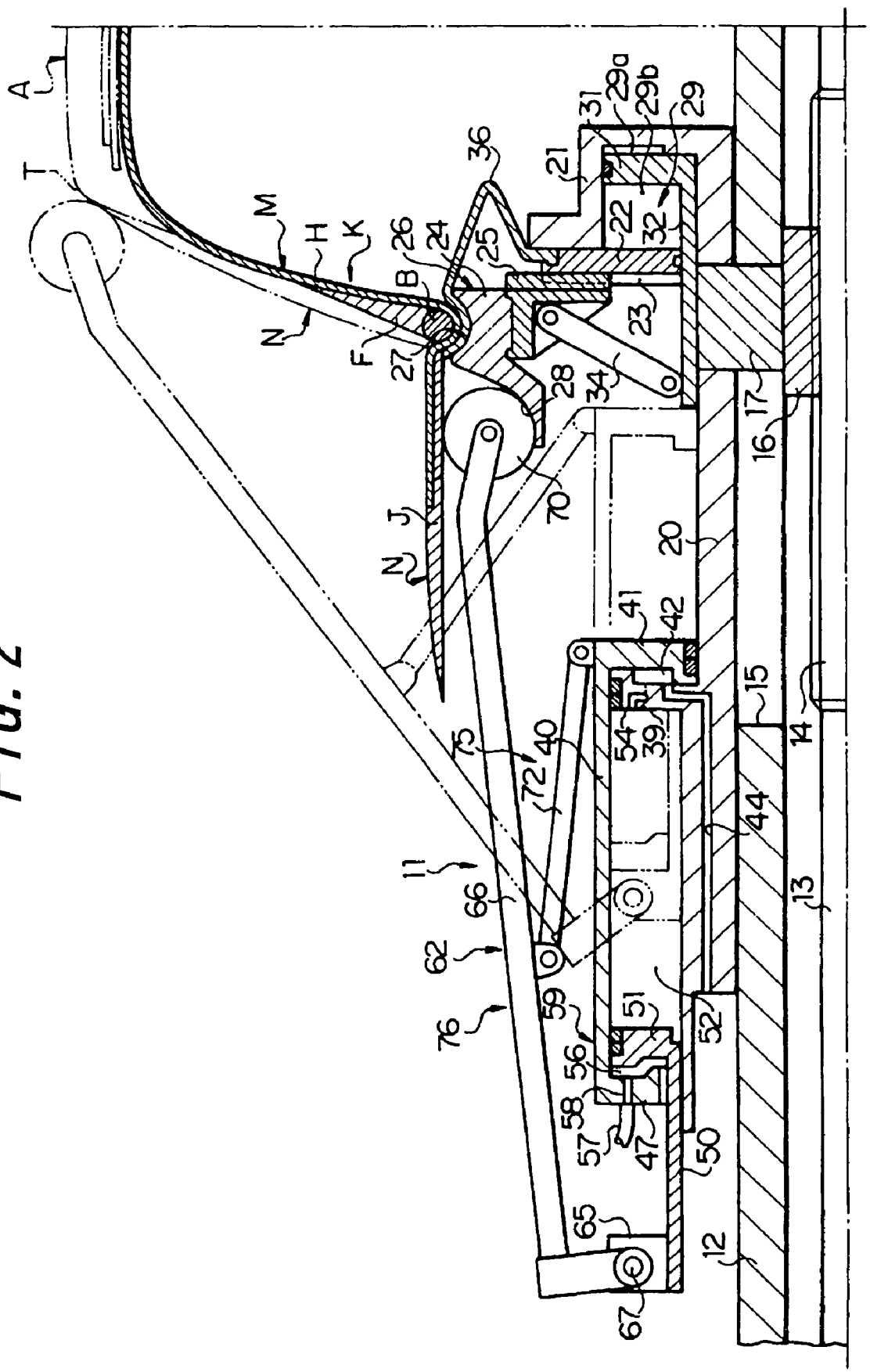
FIG. 2 is a sectional view thereof, in enlarged scale.

In FIGS. 1 and 2, reference numeral 11 denotes a tire building drum for building green tire thereon. The tire building drum 11 includes a horizontal main shaft 12 of cylindrical shape. The drum main shaft 12 is connected to a driving portion of a tire building machine (not shown), and driven into rotation about the axis by the driving portion, whenever necessary.

A screw shaft 13 coaxial with the drum main shaft 12 is loosely and rotatably fitted in the drum main shaft 12. The screw shaft 13 can be rotated by a driving motor, not shown, independently of the drum main shaft 12. Male screw portions 14, which are inverse screws, are provided on the outer circumference of the screw shaft 13 on both sides in the axial direction, respectively. Slits 15 extending in the axial direction are formed in the drum main shaft 12 along its portions overlapping the male portions 14. Reference numeral 16 denotes a nut that is in thread-engagement with each male screw portion 14. Each nut 16 is fixed to a connecting block 17 penetrating into the slit 15.

Reference numeral 20 denotes substantially cylindrical sliders which are fitted from outside on both axial sides of the drum main shaft 12 so as to be movable in the axial directions. The connecting blocks 17 are connected to the sliders 20, respectively. As a result, when the screw shaft 13 is driven into rotation by the driving motor, the sliders 20 are moved by equal distance in the opposite directions by means of the male screw portions 14 in the form of inverse screws, toward and away from each other.

The axially inner end of each slider 20 is integrally connected to a bottom wall of a cylinder case portion 21 of cylindrical shape, which is closed by a bottom. The cylinder case portion 21 has an opening at its axially outer end, which is substantially closed by a substantially annular guide flange 22 fixed thereto. A plurality of guide rails 23 extending in the radial direction are provided on the axially outer side of the guide flange 22, which are spaced from each other at an equal interval in the peripheral direction.

Reference numeral 24 denotes a plurality of bead lock segments arranged in the peripheral direction with an equal interval. Slide bearings 25 are fixed to the bead lock segments 24, which are slidably engaged with the guide rails 23. The above-described plurality of bead lock segments 24 placed on one side, as a whole, constitute a bead lock body 26. As a result, a pair of the bead lock bodies 26 are provided on the tire building drum 11 as being spaced from each other in the axial direction.

Each bead lock segment 24 has a radially outer end, which is formed with an arcuate lock groove 27 for locking a bead B with a filler F from radially inside, through a tire structure member K comprising a carcass ply H and side treads J adhered to both ends of the carcass ply H in the width direction. It is assumed that the tire structure member K has been formed into the cylindrical shape at another molding drum, the conveyed by a conveying means (not shown) together with the pair of beads B, with the fillers F set at predetermined positions outside the both axial ends of the tire structure member K, and loosely fitted onto the tire building drum 11.

On this occasion, the sliders 20 of the tire building drum 11 are moved away from each other, to the axially outer limit positions by the rotation of the screw shaft 13, while the bead lock bodies 26 are retracted to the radially inner limit positions, and the beads B with the fillers F are set outside in the radial direction of the bead lock bodies 26. In this condition, when the bead lock body 26 projects radially outward, the tire structure member K, in particular the carcass ply H, is held from both sides, between the bead lock body 26 and the bead B with the filler F.

Subsequently, the sliders 20 are moved together axially inward, by the rotation of the screw shaft 13 at a constant speed. When high-pressure fluid is supplied into the tire structure member K between the beads B, i.e., into the main body portion M, the tire structure member K between the beads B (i.e., the main body portion M) expands radially outward to have the substantially semicircular sectional shape, though the turn-up portion N on axially outside from the bead B maintains the cylindrical shape. Also, the bead lock segment 24 axially outside from the lock groove 27 is formed with a receiving surface 28 having an arcuate section inclined radially inward as it extends axially outward, such that the receiving surfaces 28 are engaged by turn-up rollers to be described hereinafter.

At the inner end in the axial direction of each slider 20, there is defined a cylinder chamber 29 surrounded by the slider 20, inclusive of the cylinder case portion 21 and the guide flange 22. Each cylinder chamber 29 axially movably accommodates an annular piston 31, which divides the above cylinder chamber 29 into an inner cylinder chamber 29A and an outer cylinder chamber 29B. Reference numeral 32 denotes cylindrical sliders each having an axially inner end integrally connected to the radially inner end of the piston 31. Each slider 32 is slidably fitted to the outer peripheral surface of the slider 20 and the inner peripheral surface of the guide flange 22. When the high pressure fluid is supplied to the inner cylinder chamber 29A, the piston 31 and the slider 32 are integrally moved axially outward. On the contrary, when the high pressure fluid is supplied to the outer cylinder chamber 29B, they are integrally moved axially inward.

Reference numeral 34 denotes a plurality of (the same in number as the bead lock segments 24) links each having an outer end rotatably connected to the bead lock segment 24, and an inner end connected to the axially outer end of the slider 32 located axially outside from the guide flange 22. These links 34 are inclined so as to opened axially inward. When the piston 31 and the slider 32 are moved axially inward, as described above, the bead lock segments 24 are synchronously moved radially outward while being guided by the guide rail 23. On the contrary, when the piston 31 and the slider 32 are moved axially outward, the bead lock segments 24 are synchronously moved radially inward.

Reference numeral 36 denotes readily deformable seal members with a substantially V-shaped section, each having its base end air-tightly fixed between the cylinder case portion 21 and the guide flange 22. When the bead B is supported from radially inside by the bead lock segments 24 through the tire structure member K, the tip end of the seal member 36 is clamped between the bead lock segments 24 and the tire structure member K. Thus, sealing is achieved between the guide flange 22 and the bead lock segment 24 and between the bead lock segment 24 and the tire structure member K.

Each slider 20 has an annular flange 39 on its outer surface in the axially center region, which is externally fitted with an inner slider 40 of substantially cylindrical shape, with the inner peripheral surface in sliding contact with the outer peripheral surface of the flange 39 so as to be movable in the axial direction. Each inner slider 40 has an axially inner end, which is provided with an annular inner end wall 41 extending radially inward. The inner end wall 41 has an inner peripheral surface in sliding contact with the outer peripheral surface of the slider 20 axially inside from the flange 39. As a result, a cylinder chamber 42 is formed between the slider 20 including the flange 39, and the inner slider 40 including the inner end wall 41.

Reference numeral 44 denotes a fluid passage formed within each slider 20. The fluid passage 44 has one end connected to a fluid source, and another end in communication with the cylinder chamber 42. As a result, when the high pressure fluid is supplied from the fluid source into the cylinder chamber 42 through the fluid passage 44, the inner slider 40 is moved axially inward. On this occasion, the inner slider 40 engages an outer slider to be described hereinafter, thereby causing the latter to be moved integrally. Also, the inner slider 40 in its axially outer end has an annular outer end wall 47 extending radially inward, so that an annular clearance is formed between the inner periphery of the outer end wall 47 and the outer periphery of the slider 20.

Reference numeral 44 denotes a fluid passage formed within each slider 20. The fluid passage 44 has one end connected to a fluid source, and another end in communication with the cylinder chamber 42. As a result, when the high pressure fluid is supplied from the fluid source into the cylinder chamber 42 through the fluid passage 44, the inner slider 40 is moved axially inward. On this occasion, the inner slider 40 engages an outer slider to be described hereinafter, thereby causing the latter to be moved integrally. Also, the inner slider 40 in its axially outer end has an annular outer end wall 47 extending radially inward, so that an annular clearance is formed between the inner periphery of the outer end wall 47 and the outer periphery of the slider 20.

Reference numeral 50 denotes a substantially cylindrical outer slider having an axial length smaller than that of the inner slider 40. The outer slider 50 axially extends through the clearance between the outer wall portion 47 of the inner slider 40 and the slider 20, and is slidably fitted in the inner periphery of the outer wall portion 47 and the outer periphery of the slider 20. Since the outer slider 50 extends through the clearance between the outer wall portion 47 and the slider 20 as mentioned above, the outer slider 50 overlaps the inner slider 40 in the radial direction at least at its axially inner end.

The outer slider 50 has an axially inner end provided with an annular inner end wall 51 extending radially outward and having an outer periphery in sliding contact with the inner periphery of the inner slider 40. As a result, a cylinder chamber 52 is formed between the slider 20 including the flange 39, the inner slider 40, and the inner end wall 51 of the outer slider 50. Reference numeral 54 denotes fluid passages formed within the respective sliders 20. Each fluid passage 54 has one end connected to a fluid source, and another end in communication with the cylinder chamber 52. As a result, when the high pressure fluid is supplied from the fluid source into the cylinder chamber 52 through the fluid passage 54, the outer slider 50 is moved axially outward. On this occasion, the outer slider 50 can be engaged by the inner slider 40 and thereby integrally moved axially outward.

A cylinder chamber 56 is formed between the inner slider 40 including the outer end wall 47, and the outer slider 50 including the inner end wall 51. The cylinder chamber 56 is connected to the fluid source through a fluid hose 57 and a communication hole 58 in the outer end wall 47. As a result, when the high pressure fluid is supplied from the fluid source into the cylinder chamber 56 through the fluid hose 57 and the communication hole 58, the outer slider 50 is moved axially inward relative to the inner slider 40, thereby increasing the overlapping amount of the outer and inner sliders 50 and 40.

The above-described fluid hose 57 and the communication hole 58, as a whole, constitute a supply/discharge passage 59 for supplying or discharging the fluid to or from the cylinder chamber 56. Also, the above-described cylinder chamber 56 and the supply/discharge passage 59, as a whole, constitute a moving mechanism 62 for axially moving the outer slider 50 relative to the inner slider 40. By constituting the moving mechanism 62 with the cylinder chamber 56 and the supply/discharge passage 59 in this way, it is possible to reduce the axial length of the entire apparatus.

A plurality of brackets 65, sixty in number in the illustrated embodiment, which is more than twice of the conventional number, are mounted on the outer periphery at the axially outer end of each outer slider 50 and arranged in the circumferential direction with an equal interval. Reference numeral 66 denotes a plurality of turn-up arms (the same in number as that of the brackets 65) placed respectively on the both axially outer sides of the tire building drum 11. These turn-up arms 66 are arranged in the circumferential direction with an equal interval. Each turn-up arm has a base end (the axially outer end) separated from the relevant bead lock body 26 and bent at right angles. The base end of the turn-up arm 66 is pivotally connected to the outer slider 50 through a pin 67 and the bracket 65. As a result, the turn-up arms 66 are capable of swing in the radial direction about the pin 67 located at the base end on the plane including the center axis of the tire building drum 11.

Turn-up rollers 70 are rotatably supported at the tip ends (axially inner ends) of the turn-up arms 66 close to the relevant bead lock body 26. These turn-up rollers 70 can be brought into rolling contact with the relevant turn-up portion N of the tire structure member K (i.e., the inner peripheral surface when it is in the cylindrical state), about the rotational axes parallel to the center axis of the pin 67. Since the number of the turn-up rollers 70 is sixty, which is more than twice of the conventional number, the pressing force applied to the turn-up portion N is dispersed and generation of impressions is restricted, besides that the turn-up portion N can be effectively turned-up at increased points.

When the above turn-up arms 66 are swung radially outward while being moved axially inward, the turn-up rollers 70 serve to turn the cylindrical turn-up portion N radially outward around the bead B, along the main body portion M with the substantially semicircular section.

Reference numeral 72 denotes a plurality of links (same in number as that of the turn-up arms 66) each extending linearly and having an inner end pivotally connected to the outer periphery of the inner slider 40 at its axially inner end. Each link 72 has an outer end pivotally connected to the longitudinal center portion of the turn-up arm 66. As a result, when the high pressure fluid is supplied to the cylinder chamber 56 and the outer slider 50 is thereby moved axially inward relative to the inner slider 40, the turn-up arms 66 are synchronously swung radially outward about the respective base ends (pins 67) while being restricted by the links 72.

The inner slider 40, the cylinder chambers 42, 52 and the fluid passages 44, 54, as a whole, constitute a moving means 75 for synchronously moving the turn-up arm 66 in the axial directions. Similarly, the outer slider 50, the moving mechanism 62 and the link 72, as a whole, constitute a swinging means 76 for synchronously swinging the turn-up arms 66 in the radial directions. The moving means 75 and the swinging means 76 operate simultaneously when turning the turn-up portions N.

Here, when the moving means 75 is comprised of the inner sliders 40, the cylinder chambers 42, 52 and the fluid passages 44, 54, and the swinging means 76 is comprised of the outer sliders 50, the moving mechanisms 62 and the links 72, as described above, they are constructed only mechanically and there is no changeover time as in the conventional case where a rubber band is used, besides that the pressing force applied to the turn-up portions N can be made constant regardless of elapse of time, whereby a stable tire quality can be secured. Moreover, the structure of the moving means 75 and the swinging means 76 can be simplified and the manufacturing costs can be reduced.

The operation of the present invention will be explained below with reference to the above-described embodiment.

It is assumed that the sliders 20 are moved together to the radially outer limit positions by the rotation of the screw shaft 13. On this occasion, since the pistons 31 have been moved to the axially outer limit positions by the supply of the high pressure fluid into the inner cylinder chambers 29A, the bead lock bodies 26 are standing by at the radially inner limit positions. A this time, since the high pressure fluid is supplied to the cylinder chambers 52 through the fluid passages 54, the inner and the outer sliders 40, 50 are moved to the axially outer limit positions together with the inner end walls 51 in contact with the outer end walls 47, and with the links 72 swung to the radially inner limit positions to be substantially parallel to each other. By this, the turn-up arms 66 have been swung to the radially inner limit positions where the turn-up rollers 70 are in contact with the receiving surfaces 28.

Subsequently, the cylindrical tire structure member K and the bead B with the filler F, formed by another molding drum, and a belt/tread band T formed on a band forming machine (not shown), are conveyed by a conveying means (not shown) and loosely fitted onto the outer surface of the tire building drum 11. At this time, each bead B is placed or set at a predetermined position, particularly radially outside of the lock groove 27 in the relevant bead lock body 26.

Then, the high pressure fluid is supplied to the outer cylinder chambers 29B, so that the pistons 31 and the sliders 32 are moved axially inward, thereby causing the links 34 to swing radially outward, and also causing the bead lock segments 24 to be synchronously moved radially outward while being guided by the guide rail 23. The movement of the bead lock bodies 26 is stopped when the lock grooves 27 are pressed into contact with the beads B through the seal members 36 and the tire structure member K. On this occasion, the tire structure member K is held from both sides by the pair of bead lock bodies 26 and the pair of beads B.

Since a low pressure fluid is being supplied to the cylinder chambers 52, the turn-up rollers 70 are raised by the receiving surfaces 28, so that the outer sliders 50 are slightly moved axially inward relative to the inner slider 40. As a result, the distance between the base ends of the turn-up arms 66 and the inner ends of the links 72 is slightly reduced, thereby causing the turn-up arms 66 to be slightly swung radially outward about the pins 67 and the links 72 to be slightly swung radially outward about the respective inner ends. By this, the turn-up rollers 70 are moved radially outward following the bead lock bodies 26, while maintaining the contact with the receiving surfaces 28 of the bead lock bodies 26.

Next, the screw shaft 13 is rotated so that the sliders 20 are moved axially inward, i.e., toward each other, and the high pressure fluid is supplied into the tire structure member K between the beads B (i.e., into the main body portion M). As a result, the main body portion M is expanded radially outward to have a section with a substantially semicircular shape. The outer periphery at the radially outer end of the main body portion M is tightly brought into contact with the inner periphery of the belt/tread band T. At this time, the turn-up portion N located axially outside from the bead B still maintains the cylindrical shape as shown by the solid lines in FIG. 2.

The high pressure fluid is then supplied into the cylinder chambers 42 through the fluid passages 44, and also into the cylinder chambers 56 through the supply/discharge passages 59. The inner sliders 40 and the outer sliders 50 hooked by the inner sliders 40 are moved axially inward together, and the outer sliders 50 are further moved axially inward relative to the inner slider 40. Here, by the movement of the inner and the outer sliders 40, 50 axially inward, the turn-up arms 66 and the turn-up rollers 70 are integrally and synchronously moved axially inward. Further, by the movement of the outer sliders 50 axially inward relative to the inner sliders 40, the turn-up arms 66 and the links 72 are synchronously swung radially outward, and the turn-up rollers 70 are moved radially outward along the arcuate paths about the pins 67.

As a result, the turn-up rollers 70 are moved in the direction combining the axially inward movement and the radially outward movement. On this occasion, the supply amount of the high pressure fluid into the cylinder chambers 42, 56 is suitably adjusted so that the movement trajectory of the above turn-up roller 70 conforms with the shape along the main body portion M. By this, the turn-up portions N of the tire structure member K are turned up by the turn-up rollers 70 in rolling contact with the turn-up portions N radially outward along the main body portion M around the beads B and pressed into contact with the main body portion M so as to build a green tire A.

Since the turn-up arms 66 are synchronously moved by the moving means 75 axially inward with the turn-up rollers 70 in contact with the turn-up portions N as described above, while the turn-up arms 66 are synchronously swung by the swinging means 76 radially outward, the contact pressure applied by the turn-up rollers 70 to the turn-up portions N (part of the sidewall portions of the green tire A after being turned up) can be easily and positively optimized to a proper value.

As a result, impressions or grooves generated in the outer surface of the turn-up portion N can be made as shallow as possible, such that the groove can be substantially erased by vulcanization. Moreover, generation of grooves extending in the radial direction on the sidewall portion of the product tire can be easily and effectively restricted. Here, the above-described contact pressure is a resultant force of the axial force applied by the moving means 75 to the turn-up rollers 70 and the radial force applied by the swinging means 76 to the turn-up rollers 70. The value of this resultant force (contact pressure) can be controlled easily and positively, by adjusting the supply amount and supply pressure of the high pressure fluid into the cylinder chambers 42, 56.

In the above-described preferred embodiment, the turn-up portions N are turned up after the belt/tread band T has been applied onto the main body portion M of the tire structure member K. Alternatively, however, the arrangement may be such that the belt/tread band is applied onto the main body portion after the turn-up portions have been turned up around the bead. In the above-described preferred embodiment, the main body portion M is expanded to the substantially semicircular section by directly supplying the high pressure fluid into the main body portion M. Alternatively, however, the bladder may be placed in the main body portion so that the bladder and the main body portion are expanded to the substantially semi-circular section by supplying the high pressure fluid into this bladder.

INDUSTRIAL APPLICABILITY

It will be appreciated from the foregoing description that the present invention serves to effectively restrict generation of grooves in the sidewall portion of product tires.

The invention claimed is:

1. A method for turning up a tire structure member, wherein a pair of beads are supported by a tire building drum from radially inside, and substantially cylindrical turn-up portions of the tire structure member located on axially outside of the beads are turned around the beads to extend along a main body portion of the tire structure member located between the beads and having a substantially semi-circular cross-section, with an apparatus including a plurality of turn-up arms spaced from each other in a peripheral direction and arranged on both outside of the tire building drum in the axial direction, said turn-up arms each being adapted to swing in the radial direction around a base end spaced from the bead on a plane including the center axis of the tire building drum, and further including turn-up roller rotatably supported by tip ends of the turn-up arms, wherein the turn-up arms are moved synchronously by a moving means axially inward, with said turn-up rollers maintained in contact with the turn-up portion, while said turn-up arms are swung synchronously by a swinging means radially outward so that the turn-up portions are turned around the bead, wherein said moving means comprises an inner slider which is movable in the axial direction, and said swinging means comprises an outer slider slidably fitted in the inner slider and overlapped with the inner slider at least at its axially inner end, a plurality of links each having an inner end connected to the inner slider and an outer end rotatably connected to a center part in the longitudinal direction of each turn-up arm, and a moving mechanism for axially moving the outer slider relative to the inner slider.

2. An apparatus for turning up a tire structure member, wherein a pair of beads are supported by a tire building drum from radially inside, and substantially cylindrical turn-up portions of the tire structure member located on axially outside of the beads are turned around the beads to extend along a main body portion of the tire structure member located between the beads and having a substantially semi-circular cross-section, said apparatus comprising:

a plurality of turn-up arms spaced from each other in a peripheral direction and arranged on both outsides of the tire building drum in the axial direction, said turn-up arms each being adapted to swing in the radial direction around a base end spaced from the bead on a place including the center axis of the tire building drum;

a plurality of turn-up rollers rotatably supported by tip ends of the turn-up arms and adapted to achieve rolling contact with the turn-up portion;

a moving means for synchronously moving the turn-up arms in the axial direction;

and a swinging means for synchronously swinging the turn-up arms in the radial direction, wherein the turn-up arms are moved synchronously by said moving means axially inward, with said turn-up rollers maintained in contact with the turn-up portion, while said turn-up arms are swung synchronously by said swinging means radially outward so that the turn-up portions are turned around the bead, wherein said moving means comprises an inner slider which is movable in the axial direction, and said swinging means comprises an outer slider slidably fitted in the inner slider and overlapped with the inner slider at least at its axially inner end, a plurality of links each having an inner end connected to the inner slider and an outer end rotatably connected to a center part in the longitudinal direction of each turn-up arm, and a moving mechanism for axially moving the outer slider relative to the inner slider.

3. The apparatus for turning up a tire structure member according to claim 2, wherein said moving mechanism comprises a cylinder chamber formed between the inner slider and the outer slider, and a supply/discharge passage for supplying or discharging a fluid to or from the cylinder chamber.

* * * * *